(12) United States Patent
DaCosta

(10) Patent No.: US 7,593,945 B2
(45) Date of Patent: Sep. 22, 2009

(54) SYSTEM, METHOD AND APPARATUS FOR MULTI-MEDIA NEWS BLOG

(75) Inventor: Behram Mario DaCosta, San Diego, CA (US)

(73) Assignees: Sony Corporation, Tokyo (JP); Sony Electronics Inc., Park Ridge, NJ (US)

(*) Notice: Subject to any disclaimer, the term of this patent is extended or adjusted under 35 U.S.C. 154(b) by 282 days.

(21) Appl. No.: 11/361,425

(22) Filed: Feb. 24, 2006

(65) Prior Publication Data

US 2007/0213004 A1    Sep. 13, 2007

(51) Int. Cl.
*G06F 17/30*   (2006.01)
*G06F 7/00*    (2006.01)

(52) U.S. Cl. .......................................... 707/10; 707/204
(58) Field of Classification Search ................... 707/10, 707/204
See application file for complete search history.

(56) References Cited

U.S. PATENT DOCUMENTS

| | | | |
|---|---|---|---|
| 2004/0249846 A1* | 12/2004 | Randall et al. | 707/102 |
| 2005/0095981 A1* | 5/2005 | Benco | 455/3.06 |
| 2005/0197158 A1* | 9/2005 | Silverbrook et al. | 455/556.2 |
| 2005/0273489 A1* | 12/2005 | Pecht et al. | 709/203 |
| 2006/0004691 A1* | 1/2006 | Sifry | 707/1 |
| 2006/0143208 A1* | 6/2006 | Ramachandran et al. | 707/101 |

* cited by examiner

*Primary Examiner*—Kuen S Lu
(74) *Attorney, Agent, or Firm*—Fitch, Even, Tabin & Flannery

(57) ABSTRACT

A system for providing multimedia content in accordance with one embodiment comprising an first electronic device for capturing multimedia content; a wireless services network for receiving the multimedia content from the first electronic device upon being sent from the electronic device; a blog database coupled to the wireless services network for storing the multimedia content; and a second electronic device adapted to receive the multimedia content stored in the database.

17 Claims, 4 Drawing Sheets

SYSTEM, METHOD AND APPARATUS FOR MULTI-MEDIA NEWS BLOG

BACKGROUND OF THE INVENTION

1. Field of the Invention

The present invention relates to providing posting and retrieving multimedia content. More specifically, the present invention relates to posting and retrieving content from a database. Even more specifically, the present invention relates to posting and retrieving multimedia news content to a news blog database.

2. Discussion of the Related Art

News providers (e.g., CNN, NBC, etc.) do not have the capability to have representatives or reporters available at every location where a news-worthy story or event is happening. For example, during a terrorist attack, accident, or other unexpected event, it is unlikely official representatives of the news providers will be present for the entire event or even a portion of the event. This limits the capability of the news providers to provide access to compelling content regarding new events. The users of electronic devices (e.g., televisions, cellular telephones, personal digital assistants, computers, etc.) that receive the news stories would tend to use such devices more if more compelling stories were available. This would lead to an increase in revenue for the news providers.

While the news providers do not always have a representative present at such newsworthy events, there is a high likelihood that a bystander who happened to be located at the event will own a multimedia recording device (e.g., a video recorder, a cellular telephone, a digital camera, etc.). This makes it likely that bystanders or other witnesses to such an event will be able to record the event (e.g., take a picture or video clip). Some news providers have started seeking out eye-witnesses to such events for the purpose of using the recorded content of the bystander for a news story. For example, BBC news has used photographs taken by commuters on the bombed London underground trains to show the immediate aftermath of the bombings. However, not all such user-recorded content was available, and what was available was generally not available until hours after the bombing incidents. Therefore, what is needed is a way for bystanders to easily and quickly make multimedia content related to newsworthy events available to other people.

SUMMARY OF THE INVENTION

The present invention provides a system, method and apparatus for a bystander of a newsworthy event to post timely multimedia content to a database and for users to quickly access the multimedia content.

One embodiment can be characterized as a method of providing multimedia content comprising receiving over a wireless service network multimedia content related to an event from a first electronic device; storing the multimedia content related to the event in a blog database; sending the multimedia content related to the event to a second electronic device.

Another embodiment can be characterized as a system for providing multimedia content comprising an first electronic device for capturing multimedia content; a wireless services network for receiving the multimedia content from the first electronic device upon being sent from the electronic device; a blog database coupled to the wireless services network for storing the multimedia content; and a second electronic device adapted to receive the multimedia content stored in the database.

A subsequent embodiment includes an apparatus for providing or receiving multimedia content comprising a multimedia recording device; a memory for storing multimedia content captured by the multimedia recording device; a processor for controlling communication with an wireless network; a housing configured to house the processor, the memory and the multimedia recording device; a user interface coupled to the housing, wherein the user interface includes a first dedicated button for initiating the sending or receiving of multimedia content from a blog database.

BRIEF DESCRIPTION OF THE DRAWINGS

The above and other aspects, features and advantages of the present invention will be more apparent from the following more particular description thereof, presented in conjunction with the following drawings, wherein.

Figure 1:
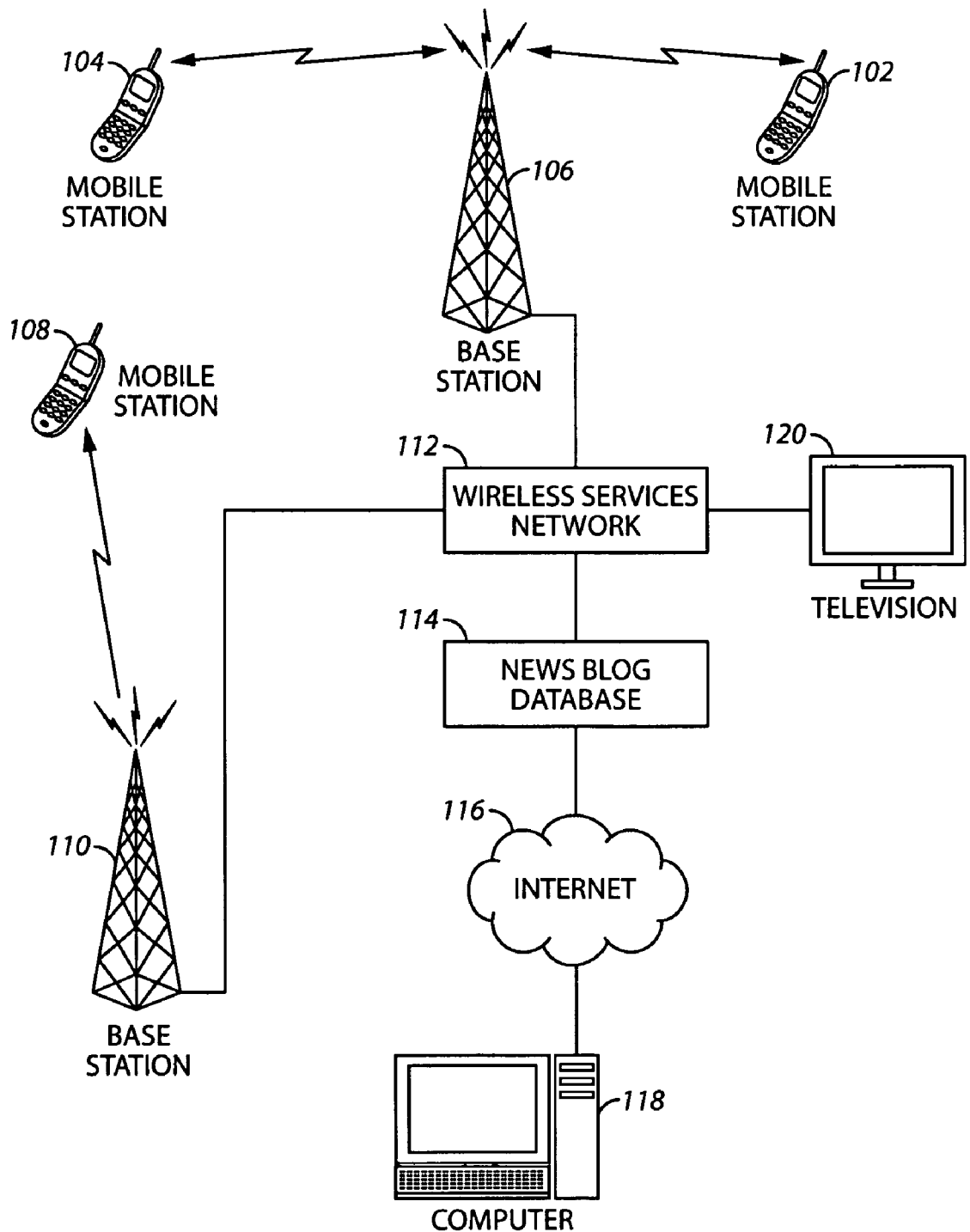
FIG. 1 is a diagram illustrating a system for posting and retrieving multimedia content in accordance with one embodiment.

Corresponding reference characters indicate corresponding components throughout the several views of the drawings. Skilled artisans will appreciate that elements in the figures are illustrated for simplicity and clarity and have not necessarily been drawn to scale. For example, the dimensions, sizing, and/or relative placement of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will also be understood that the terms and expressions used herein have the ordinary meaning as is usually accorded to such terms and expressions by those skilled in the corresponding respective areas of inquiry and study except where other specific meanings have otherwise been set forth herein.

DETAILED DESCRIPTION

The following description is not to be taken in a limiting sense, but is made merely for the purpose of describing the general principles of the invention. The scope of the invention should be determined with reference to the claims. The present embodiments address the problems described in the background while also addressing other additional problems as will be seen from the following detailed description.

The system and apparatus described herein below provide examples of how a user can post and retrieve multimedia content to and from a news blog database.

FIG. 1 is a diagram illustrating a system for posting and retrieving multimedia content in accordance with one embodiment. Shown is a first mobile device 102, a second mobile device 104, a first base station 106, a third mobile device 108, a second base station 110, a wireless services network 112, a news blog database 114, an Internet 116, a computer 118 and a television 120.

The first mobile device 102 and the second mobile device are both in communication with the first base station 106. The first base station 106 is connected to the wireless services network 112. The third mobile device 108 is in communication with the second base station 110 which is also connected to the wireless services network 112. In the embodiment shown, the wireless services network 112 can store and retrieve multimedia content to and from the news blog database 114. The first mobile device 102, the second mobile device 104, and the third mobile device 108 all indirectly have access to the news blog database 114 when connected to the wireless services network 112. Additionally, the television 120 can receive multimedia content from the news blog database 114 when connected to the wireless services network 112 through, for example, an Internet Protocol Television (IPTV) connection. As shown, the news blog database 114, in some embodiments, can also be accessed by the computer 118 through the Internet 116. Alternatively, only devices connected to the wireless services network 112 have access to the news blog database 114.

The first mobile device 102, as shown, is a cellular telephone. However, it should be understood that the first mobile device 102 can be any electronic device capable of communicating with the first base station 106. For example, the first mobile device 102 can be a computer, a personal digital assistant or other similar types of devices. The second mobile device 104 and the third mobile device 108 are also any type of electronic device that is capable of communicating with the base station.

A blog is generally a website (or web page, i.e., html page or the like) on which informational items (information data) are posted on a regular basis and displayed in reverse chronological order. The informational items may be news stories, experiential accounts, thoughts, a diary, assignments, descriptions, briefs, characterizations, chronicles, confessions, declarations, definitions, delineations, depictions, details, explanations, explications, information, monographs, narrations, narratives, pictures, portraitures, portrayals, presentments, recitals, recitations, records, recountals, reports, representations, run downs, sketches, specifications, statements, stories, summarizations, summaries, tales, versions, vignettes, write-ups, elucidations, expositions, illuminations, interpretations, resolutions, simplifications, solutions, unravelments, vivifications, thoughts, attentions, cognizance, concentration, notes, notices, observances, observations, recollections, remarks, remembrances, or the like. The term blog is a shortened form of weblog or web log. Authoring a blog, maintaining a blog or adding an article to an existing blog is called blogging. Individual articles on a blog are called "blog posts," "posts" or "entries". Generally, blogs are accessible through the Internet, are hosted on a web server and are delivered to a web client (web browser) on a client device (or apparatus) via a web protocol, such as http, https, wap or the like. Postings are made by an individual who controls the blog, and are effected by updating the web page, such as by editing the web page with a text or html editor, and uploading the page via the internet to the web server, such as by ftp, http, or https. This updating may also or alternatively be effected by updating a database of a database backed-web page, or by updating an RSS or XML data source, a text file, another web page, or the like. In such case, the display of the blog is effected dynamically when the web page is accessed (i.e., requested by the web client of the web server), such as through the triggering of server-side scripts (e.g., dynamic html, asp scripts, ECMAScript or JavaScript scripts or the like) when a request is made by the web client of the web server to deliver the web page to the client device. In such case, such server-side scripts direct the web server to the access the database or RSS or XML data source, text file, other web page, or the like, and to dynamically build the web page, e.g., html, to effect the display of the blog by the web client. In any case, whether database backed, RSS, or XML, data source, text file or other web page based, (i.e., dynamically generated) or not, such as a "static" html page, the web client effects display of the blog when the web page containing the blog is delivered to the client device. (Note that the blog may also be dynamically generated by the web client of the client device, such as through the use of client-side scripts that access data sources, such as RSS or XML data sources, text files, other web pages, or the like. The individual who controls the blog is referred to as a "blogger." The individual posts entries to the blog by submitting posts the blog through an Internet connection.

As defined herein a blog database or news blog database 112 refers to a database where multimedia content submitted by a plurality of users is stored. This "database" may simply be an organized set of files on a web server, or may be a database, such as a relational database or object oriented database, such as may be used with a database-based web page, or may be another data source, such as an RSS or XML data source, or an organized set of text files, or the like.

In some embodiments, the news blog database 114 is a database where multimedia content is posted to the blog by a plurality of users over the wireless services network 112. The news blog database 114 can be maintained as a website, however, the news blog database 114 alternatively is a database that is not available over the Internet but can only be posted to through the wireless services network 112. The news blog database 114 can be operated by the wireless services network 112 or by a third party. The news blog database 114 optionally can also include location data that is associated with each piece of multimedia content that is posted to the blog database. The location data is indicative of a location or approximate location of where the multimedia content was recorded or captured or where the electronic device that is posting the multimedia content to the website is currently located. Additionally, the news blog database 114 can include identity information that identifies the user that posted the multimedia content to the blog database. This information can be kept confidential or can be supplied to a person who requests the information. Along with the multimedia content, each posting can include, for example, text data or a voice recording that is associated with the multimedia content and submitted with the multimedia content by a user. The text data or voice recording, for example, can provide additional information about the multimedia content. In this manner, when a second user retrieves multimedia content from the news blog database, the text data and voice data is also retrieved and can provide the second user with information about what the multimedia content is showning. For example, a picture of a car crash may be stored along with a text or a voice note describing the exact location of the car crash. This information may help a user to take an alternate route and avoid stopped traffic that is usually associated with a car crash.

In operation, in accordance with one embodiment, a user of the first mobile device 102 records multimedia content at the mobile station. The recorded multimedia content is, for example, a picture or a video clip. As is common today, many mobile devices incorporate a digital camera and/or video camera. The multimedia content can be recorded by the first mobile device 102 or by a separate multimedia recorder and then loaded onto the first mobile device 102. The multimedia content is content that is, for example, related to an event the user is witnessing. For example, consider the following scenario. The user of the first mobile device 102 is driving on a freeway to work and is stuck in traffic due to a sudden wildfire that has reached the edge of the freeway. The user takes a picture or video clip of the wildfire and sends the multimedia content (e.g., the picture or video clip) over the first base station 106 to the wireless services network 112. The wireless services network 112 posts (i.e., stores) the pictures to the news blog database 114. Along with the posting of the multimedia content, the wireless services network 112 stores location and time information along with the multimedia content. The location of the user can be determined in a variety of different ways, as will be described herein below. One such manner is to determine the location of the user based upon which base station they are communicating through.

After the multimedia content has been posted, other users having access to the news blog database 114 can gain access to the multimedia content. For example, a user of the second mobile device 104 may also be stuck in traffic, however, has yet to determine the cause of the traffic. The user of the second mobile device 104 can retrieve the posted multimedia content by requesting any blog postings that have recently been posted for their relative location. As shown, the user of the second mobile device 104 is also in communication with the wireless services network 112 through the first base station 106. Thus, in accordance with the present embodiment, the multimedia content that was posted by the user of the first mobile device 102 will be retrieved from the news blog database 114 and will be sent to the second mobile station 104. In this manner, the user of the second mobile device 104 is provided with news information that is current and related to an event happening in their present approximate location.

Additionally, a user can choose to retrieve multimedia information for a location other than their present location. For example, a user could request multimedia information in the vicinity of their home or work while they are out of town. The location can be based upon a city, a zip code, an address, or other types of location information.

In order to determine the location of a device that is either requesting or posting information to the news blog database 114, many different approaches may be utilized. As described above, the location may be approximated based upon the base station the device is communicating with. Additionally, many times the electronic device will be within range of three or more base stations in which case the wireless service provider can use triangulation to determine a more precise location of the device. As another example, a cellular telephone can determine its own location. Alternatively, a user can specifically notify the system of their location or global positioning system technology can be utilized to determine the location of the device. Still alternatively, an Internet Protocol (IP) address of a computer can be used to determine location of a computer that is attempting to retrieve postings from the news blog database 114.

In addition to accessing the news blog database 114 from one of the mobile stations, a user can optionally access the news blog database 114 from the computer 118 that has access to the news blog database 114 over the Internet 116. Alternatively, a user can view postings in the news blog database on a television that is connected to the wireless services network, for example, through an Internet Protocol Television (IPTV) connection. In this manner, postings to the news blog database 114 can be directly viewed on the television 120.

A user may choose to override the location information either for posting or retrieving multimedia content from the news blog database 114. For example, a user may request the content from the news blog database for a location other than their present location. The request for information from a different location may be done, for example, by zip code, area code, name of an area, or name of a town.

The news blog database 114 can be an individual database or can be a collection of smaller databases. For example, the news blog database includes, in one embodiment, postings of multimedia content from multiple geographic areas. The postings optionally have associated with them, location information such that the location where the multimedia content is from is associated with the content. Alternatively, there are a plurality of smaller databases that are each individually associated with a specific area. Multimedia content is then posted to a specific news blog that is based upon a certain geographic area. Along with the multimedia content, a user can associate additional data with the posting. For example, a user can take a picture of an accident and record a voice note that contains information about the picture. The voice note and picture (which can be automatically converted to text using computational speech-to-text conversion such as is know in the art) are then posted to the news blog database along with location information. In this manner, a second user can view the picture and the voice note after it has been posted to the news blog database 114.

In some embodiments, when posting to the news blog database a user will be required to identify themselves as the poster. That is, the user may have to sign the submission such that at least the wireless service provider knows the identity of the person making the posting. The identity of the person making the posting can be kept confidential by the wireless service provider or can be made available to anyone accessing the news blog database. In this manner, prank postings or inappropriate postings to the news blog database can be dissuaded. Additionally, the identity of the poster can be utilized for the purpose of determining copyrights for the posting.

In one embodiment, a user must sign-up prior to utilizing the news blog database 114. For example, the user must sign up before submitting a posting to the news blog database 114 or to retrieve a posting from the news blog database 114. The sign up procedure includes, for example, positively identifying the user and the user's electronic device.

The news blog database 114 can be maintained either by the wireless services network or by a third party. When maintained by a third party, the electronic device can include a third party software application that negotiates posting and retrieving content from the news blog database 114. In this embodiment, the mobile device sends multimedia content along with location information over the wireless services network and to a third party. The third party then posts the multimedia content, for example, on a web-site on the Internet. In this manner, the wireless services network 112 is used to access the Internet, however, the wireless services network 112 does not provide any specific support for the news blog database 114.

Figure 2:
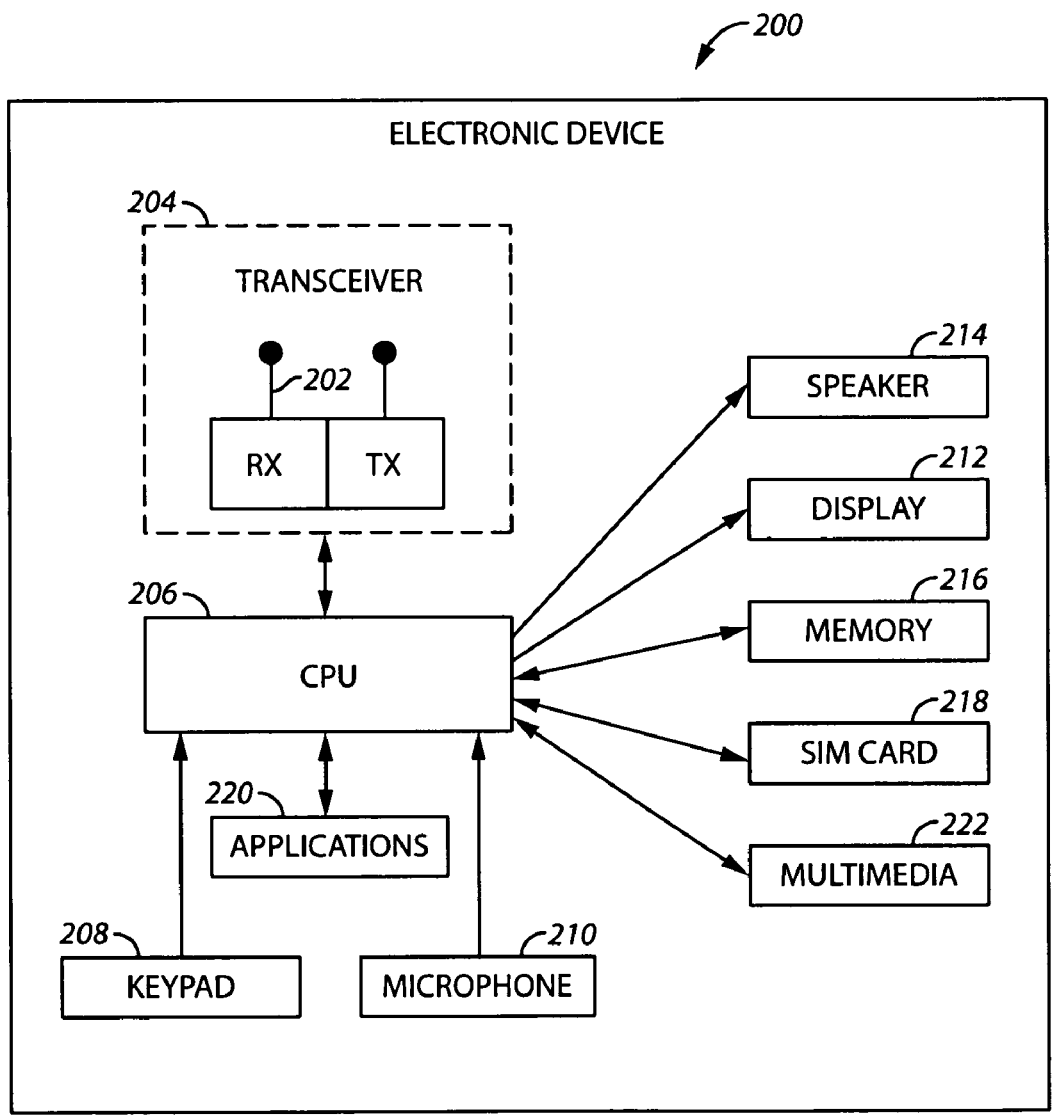
FIG. 2 is a block diagram illustrating an electronic apparatus for posting and retrieving multimedia content in accordance with one embodiment.

FIG. 2 is a block diagram illustrating an electronic apparatus for posting and retrieving multimedia content in accordance with one embodiment. Shown is an electronic device 200, an antenna 202, a transceiver 204, a processor unit 206, a keypad 208, a microphone 210, a display 212, a speaker 214, a nonremovable memory 216, a removable memory 218, applications block 220 and a multimedia device 222.

FIG. 2 shows a block diagram of a typical mobile communication device, such as a mobile handset. While a mobile phone is shown as the electronic device 200, those skilled in the relevant art will appreciate that the invention can be practiced with other devices and configurations, including Internet appliances, hand-held devices, wearable computers, multiprocessor systems, microprocessor-based or programmable consumer electronics, set-top boxes, persona digital assistants (PDAs), portable laptop computers, and the like. The term "electronic device" is intended to include all such devices.

The electronic device 200 has one or more internal or external antennas, shown as the antenna 202, for receiving and transmitting electromagnetic signals such as radio frequency signals. The transceiver 204 is connected to the antenna 202 and typically provides modulation and demodulation of the transmitted and received signals, respectively. The processor unit 206 connected to the transceiver 204 may comprise a signal processor, microprocessor, ASIC, or other control and processing logic circuitry. The processor unit 206 may perform signal coding, data processing, input/output processing, power control, and other functions necessary for implementing a mobile communication device. A customer can provide input to the processor unit 206 via the keypad 208, the microphone 210, or display 212 when implemented as a touchpad. While not illustrated, other input devices may be used, including a keyboard, a touch-sensitive screen, a pointing device such as a mouse or pen, a joystick, a game pad, a scanner, etc.

In turn, the processor unit 206 may provide information to the customer via the display 212 or the speaker 214. In accordance with the embodiments described herein, the display 212 and the speaker 214 are used to present multimedia content retrieved from the news blog database 114 to a user of the electronic device 200.

The processor unit 206 may access information from, and store information in, a nonremovable memory 216 or a removable memory 218. The nonremovable memory 216 may consist of RAM, ROM, a hard disk, or other well-known memory storage technologies. The removable memory 218 may consist of Subscriber Identity Module (SIM) cards, which are well known in GSM communication systems, or other well-known memory storage technologies, such as "smart cards." The applications block 220, can include, for example, instant messaging applications, wireless content browser applications, and address book applications can be implemented in either the removable memory 218 or the nonremovable memory 216. The applications block 220 can also include an application for posting and requesting multimedia content from the news blog database. Additionally, the removable memory 218 or the nonremovable memory 216 can be used to store multimedia content that is to be posted to the news blog database 114 or that has been retrieved from the news blog database 114.

The electronic device 200 optionally includes a multimedia device 222. The multimedia device 222 is, for example, a digital camera or video recording device. An application running on the electronic device 200 controls the operation of the multimedia device 222.

As described above, the electronic device 200 also includes, in some embodiments, an application related to posting and retrieving multimedia content from the news blog database 114. In this way, when the user desired to post or retrieve multimedia content from the blog news database, the user can simply invoke the application. For example, the application can be invoked by selecting a "post blog" or "retrieve blog" button on the electronic device. The "post blog" or "retrieve blog" buttons are part of the keypad 208 and shown and described in more detail below with reference to FIG. 3. Alternative to having specific buttons for posting and retrieving multimedia content from the news blog database 114, a menu structure can be utilized create a submission to the news blog database 114. For example, the menu structure could allow for the creation of a message similarly to creating a text message or creating a picture message to send to a friend.

Figure 3:
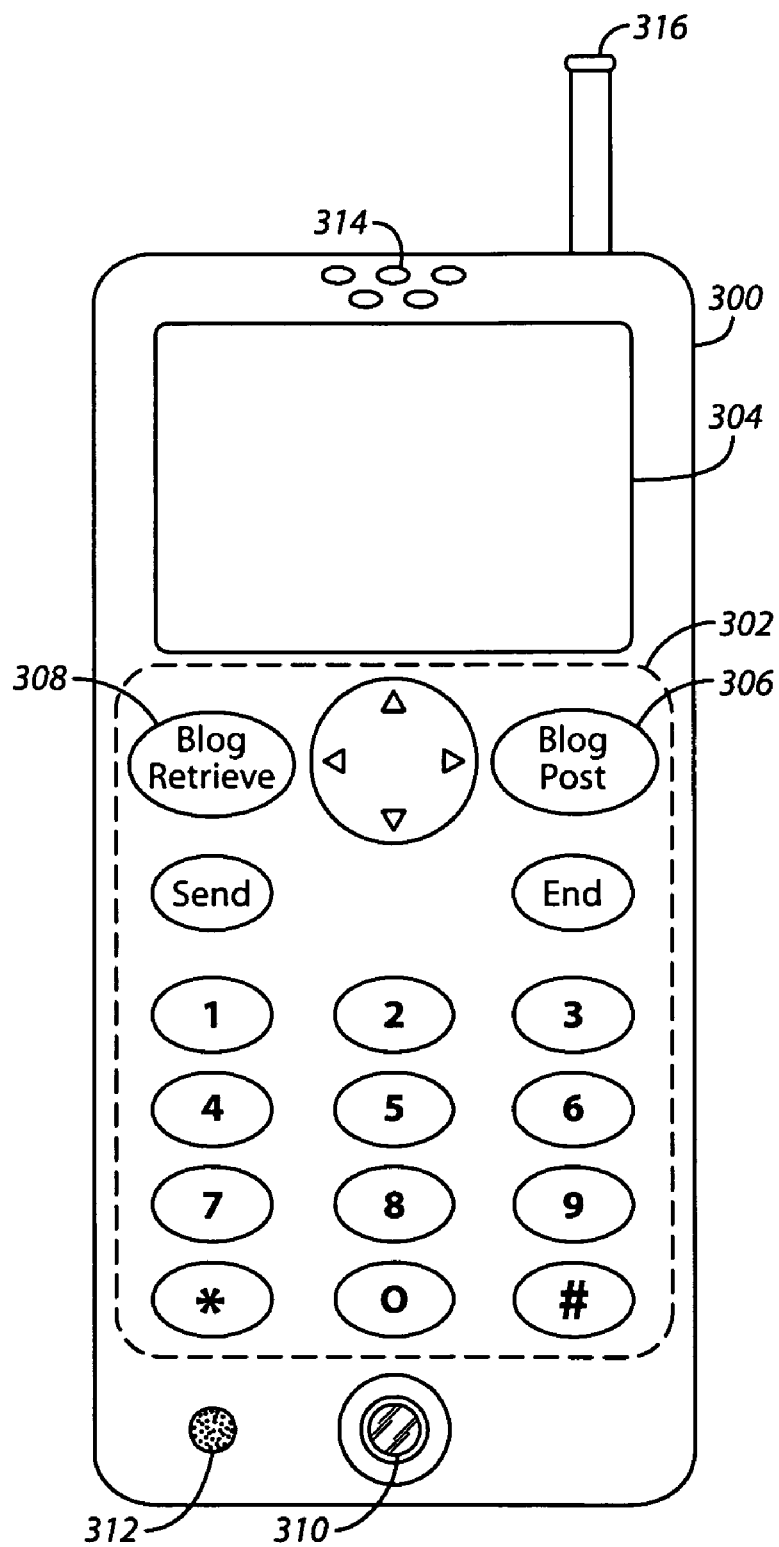
FIG. 3 is a diagram illustrating an apparatus for posting and retrieving multimedia content in accordance with another embodiment.

FIG. 3 is a diagram illustrating an electronic apparatus for posting and retrieving multimedia content in accordance with another embodiment. Shown is a housing 300, a keypad 302, a display screen 304, a post blog button 306, a retrieve blog button 308, a lens 310, a microphone 312, a speaker 314, and an antenna 316.

It should be understood that the keypad 302 can be implemented in a number of different ways such as is known in the art. For example, the keypad 302 can be implemented using physical buttons carried by and at least partially accessible to the user through a portion of the housing 300. Alternatively, the keypad 302 includes a touch-sensitive screen and the post blog button 306 and the retrieve blog button 308 are implemented as a software switch controlled by a processor unit. Other implementations of the keypad 302 can also be utilized as will be understood to one of skill in the art.

In operation, the electronic device includes, for example, a multimedia device that captures images (either pictures or video) through the lens. In accordance with the embodiments described herein, the captured images can then be posted to the news blog database 114 of FIG. 1. After capturing multimedia content, a user will select the post blog button 306. An application, running on the electronic device will send (either automatically or upon confirmation from the user) the multimedia content to the wireless services network 112. The multimedia content will then be stored in the news blog database. In one preferred embodiment, the electronic device will send location information along with the multimedia content. Furthermore, a voice note, text or other additional data may also be sent with the multimedia content and stored in the news blog database 114.

In operation, the retrieve blog button 308 is used to retrieve information from news blog database 114. In order to retrieve postings from the news blog database, in one embodiment, the user only needs to select the retrieve blog button 308 and the postings are sent over the wireless services network 112 to the electronic device. As described above, the postings can be for a particular area or location. In one embodiment, the wireless services network 112 determines an approximate location of the electronic device and sends all of the postings for that approximate location to the electronic device. The electronic device, upon receipt of the postings, displays the multimedia content on the display screen 304. Additionally, if there is text or audio data (e.g., a voice note) that accompanies the multimedia content, the text will be displayed and the audio data will be played through the speaker 314.

Optionally, a user who makes a submission to the news blog database 114 can choose to make the content viewable to other users either at no cost or for a fee. If the user decides to charge a fee, the viewer of the content must pay a fee in order to retrieve the particular submission. The payment method is ideally automated, however, the specific technique of paying for the content is beyond the scope of the present application.

Figure 4:
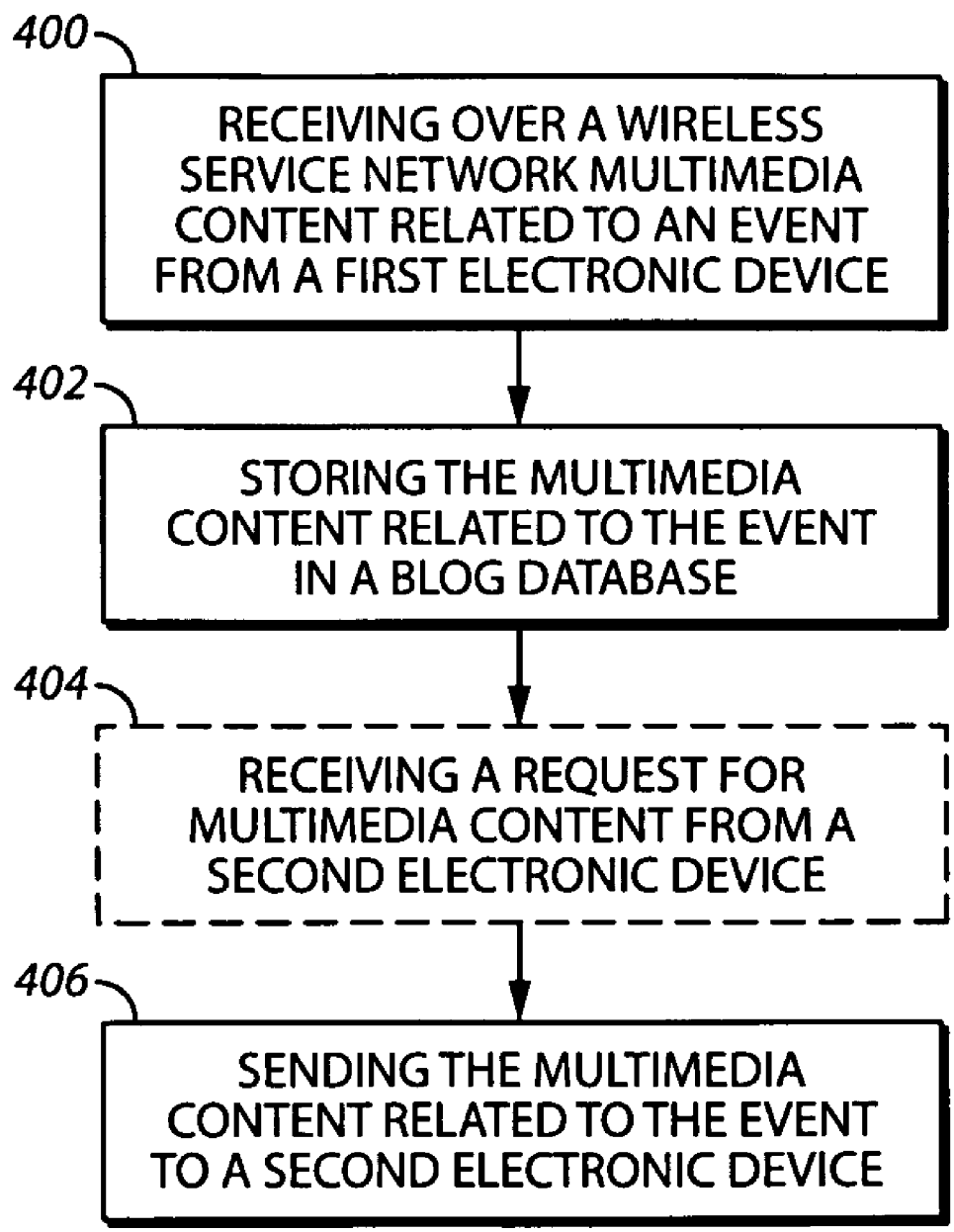
FIG. 4 is a flow diagram illustrating a method for posting and retrieving multimedia content in accordance with yet another embodiment.

FIG. 4 is a flow diagram illustrating a method for posting and retrieving multimedia content in accordance with yet another embodiment.

In step 400, multimedia content related to an event is received over a wireless service network from a first electronic device. The multimedia content is for example, a picture or video clip related to a newsworthy event.

Next in step 402, the multimedia content related to the event is stored in a blog database. Optionally, along with the multimedia content, location information is stored along with the multimedia content. As described above, the location information can be determined in many different ways.

Following, in optional step 404, a request for multimedia content is received from a second electronic device. Optionally, the request includes location information about the second electronic device. The location information is used to determine what multimedia content from the blog database should be sent to the second electronic device. The location information can be either the current approximate location of the electronic device or a separate location for which the electronic device is interested in receiving multimedia content.

In step 406, the multimedia content related to the event is sent to the second electronic device. In this manner a user of the second electronic device can view multimedia content that is posted to the blog database by the first electronic device.

While the invention herein disclosed has been described by means of specific embodiments and applications thereof, other modifications, variations, and arrangements of the present invention may be made in accordance with the above teachings other than as specifically described to practice the invention within the spirit and scope defined by the following claims.

I claim

1. A method of providing multimedia content comprising:
   receiving over a wireless service network multimedia content related to an event from a first electronic device;
   storing the multimedia content related to the event in a blog database;
   storing location information comprising geographic location information corresponding to an approximate first geographic location where the event occurred,
      wherein the location information is associated with the multimedia content;
   associating the location information with the multimedia content;
   receiving a request for multimedia content from a second electronic device;
   identifying a second geographic location corresponding to a location of the second electronic device;
   determining whether the geographic location information, associated with the multimedia content, geographically corresponds to the second geographic location of the second electronic device; and
      sending, when the geographic location information geographically corresponds to the second geographic location, the multimedia content related to the event to the second electronic device.

2. The method of providing multimedia content of claim 1 further comprising receiving a request for multimedia content from the second electronic device and implementing the sending in response to receiving the request.

3. The method of providing multimedia content of claim 1 further comprising sending over the wireless services network the multimedia content related to the event to the second electronic device.

4. The method of providing multimedia content of claim 1 further comprising determining an approximate location of the second electronic device.

5. The method of claim 1, wherein the blog database includes user identity information that identifies a user that sent the multimedia content to the blog database;
   receiving a request form a user associated with a second device for user identification device associated with multimedia content; and
   sending to the user associated with the second device the user identity information when the request for the identity information is received.

6. The method of claim 1, wherein identifying a second geographic location comprises receiving the second geographic location from the second device where the second geographic location is different than an actual location of the second device at the time the second location information is communicated.

7. The method of claim 1, wherein the storing the multimedia content comprises associating the multimedia content with additional multimedia content where the location information of the multimedia content and additional location information for each of the additional multimedia content are within one of a plurality of geographic areas.

8. A system for providing multimedia content comprising:
   a first electronic device for capturing multimedia content;
   a wireless services network for receiving the multimedia content from the first electronic device upon being sent from the electronic device;
   a blog database coupled to the wireless services network for storing the multimedia content and location data of the first electronic device,
   wherein the location data is associated with a geographic location of a subject captured by the multimedia content; and
   a second electronic device adapted to receive the multimedia content stored in the database; and
   the second electronic device receives the multimedia content based upon a geographic location of the second electronic device, wherein
      a second geographic location corresponding to a location of the second electronic device is identified,
      whether the geographic location information, associated with the multimedia content, geographically corresponds to the second geographic location of the second electronic device is determined, and
      the multimedia content related to the event to the second electronic device is sent, when the geographic location information geographically corresponds to the second geographic location.

9. The system for providing multimedia content of claim 8 wherein the wireless services network determines the location data about the first electronic device.

10. The system for providing multimedia content of claim 8 wherein the blog database stores multimedia content received from a plurality of electronic devices.

11. The system for providing multimedia content of claim 10 wherein the blog database further includes location data for each of the plurality of electronic devices, wherein the location data for each of the plurality of electronic devices is associated with the multimedia content for a respective one of the plurality of electronic devices.

12. The system for providing multimedia content of claim 8 wherein the second electronic device is adapted to receive the multimedia content from the blog database over the wireless services network.

13. An apparatus for providing or receiving multimedia content comprising:
   a multimedia recording device;
   a memory for storing multimedia content captured by the multimedia recording device;
   a processor for controlling communication with a wireless network;
   a housing configured to house the processor, the memory and the multimedia recording device;

a user interface coupled to the housing, wherein the user interface includes a first dedicated button for initiating sending of the stored multimedia content to a blog database or receiving of multimedia content from the blog database;
   wherein the user interface includes the first dedicated button for initiating the sending of the stored multimedia content to the blog database and a second dedicated button for initiating the receiving of the multimedia content from the blog database,
   wherein the processor performs steps comprising:
   receiving over a wireless service network multimedia content related to an event from a first electronic device;
   storing the multimedia content related to the event in the blog database;
   storing location information comprising geographic location information corresponding to an approximate first geographic location where the event occurred, wherein the location information is associated with the multimedia content;
   associating the location information with the multimedia content;
receiving a request for multimedia content from a second electronic device;
   identifying a second geographic location corresponding to a location of the second electronic device;
   determining whether the geographic location information, associated with the multimedia content. geographically corresponds to the second geographic location of the second electronic device; and
   sending, when the geographic location information geographically corresponds to the second geographic location, the multimedia content related to the event to the second electronic device.

14. The apparatus for providing or receiving multimedia content of claim 13 wherein the first dedicated button and the second dedicated button are physical buttons carried by and at least partially accessible to the user through a portion of the housing.

15. The apparatus for providing or receiving multimedia content of claim 13 wherein the user interface includes a touch-sensitive screen and the first dedicated button and the second dedicated button are software switches controlled by the processor.

16. The apparatus for providing or receiving multimedia content of claim 13 wherein the first dedicated button is a physical button carried by and at least partially accessible to the user through a portion of the housing.

17. The apparatus for providing or receiving multimedia content of claim 13 wherein the user interface includes a touch-sensitive screen and the first dedicated button is a software switch controlled by the processor.

* * * * *

UNITED STATES PATENT AND TRADEMARK OFFICE
CERTIFICATE OF CORRECTION

PATENT NO. : 7,593,945 B2  
APPLICATION NO. : 11/361425  
DATED : September 22, 2009  
INVENTOR(S) : DaCosta Page 1 of 1

It is certified that error appears in the above-identified patent and that said Letters Patent is hereby corrected as shown below:

Claim 5, column 9, line 65, delete "form" and insert --from--.  
Claim 8, column 10, line 26, after "content;" delete "and".  
Claim 13, column 12, line 2, delete "content." and insert --content,--.

Signed and Sealed this

Eighth Day of December, 2009

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,593,945 B2 | Page 1 of 1 |
| APPLICATION NO. | : 11/361425 | |
| DATED | : September 22, 2009 | |
| INVENTOR(S) | : Behram Mario DaCosta | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 301 days.

Signed and Sealed this

Twenty-eighth Day of September, 2010

David J. Kappos
*Director of the United States Patent and Trademark Office*